May 14, 1963 J. H. WENSLEY 3,089,644

ELECTRONIC CALCULATING APPARATUS

Filed March 10, 1960 2 Sheets-Sheet 1

INVENTOR
JOHN HENRY WENSLEY
BY Hane and Nydick
ATTORNEYS

INVENTOR
JOHN HENRY WENSLEY
BY Haun and Nydick
ATTORNEYS

United States Patent Office 3,089,644
Patented May 14, 1963

3,089,644

ELECTRONIC CALCULATING APPARATUS

John Henry Wensley, Potten End, Berkhamsted, England, assignor to Computer Developments Limited Filed Mar. 10, 1960, Ser. No. 14,031
Claims priority, application Great Britain Mar. 24, 1959
8 Claims. (Cl. 235—169)

Figure 1:
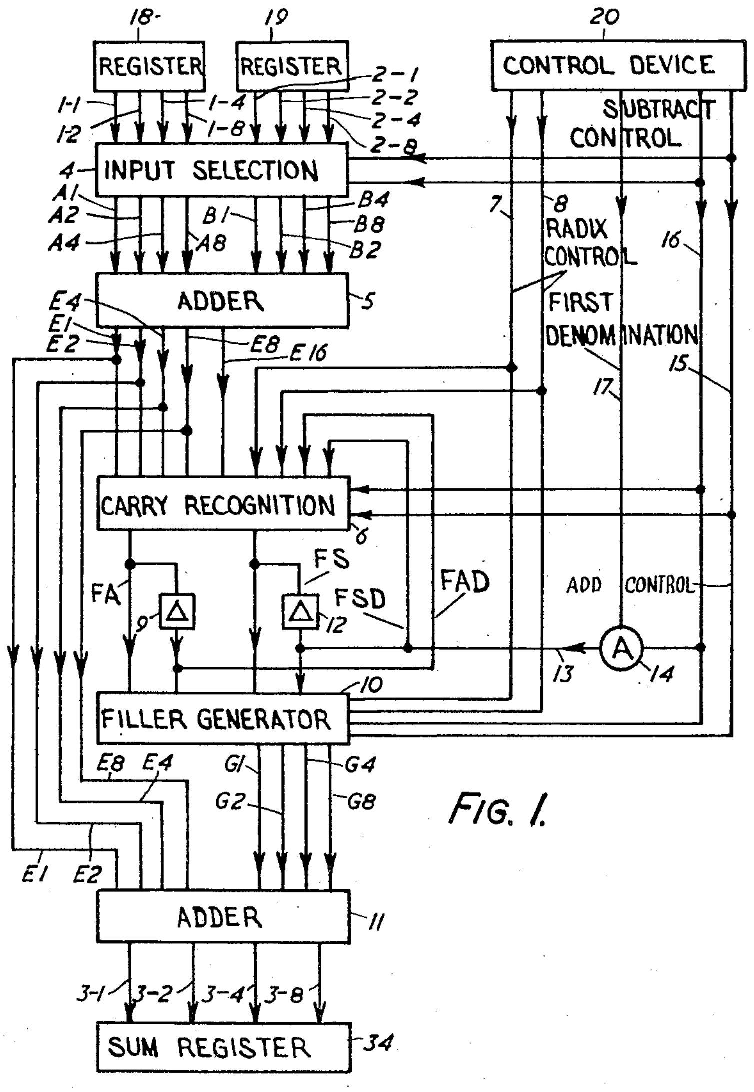

The present invention relates to electronic calculating apparatus.

In is an object of the present invention to provide improved calculating apparatus for adding or subtracting two digits, both digits being represented by coded electrical signals.

Another object of the invention is to provide electronic apparatus arranged to receive groups of electrical signals in succession, two groups of signals each representing a digit being received simultaneously at each step in the succession, and to produce a succession of output signal groups, each of the groups so produced representing the sum of or the difference between the two digits received at each step, the initial addition or subtraction being performed in a primary calculating stage and a single group of value representing correction signals being added to the result of the primary calculation at a secondary calculating stage, the correction signals being coded signals representing carry, borrow or filler digits, the output signal groups being produced as the result of the secondary calculation.

Adding arrangements have previously been proposed, for example, in British patent specification No. 767,694, in which binary-coded digits are applied in pairs of increasing denominational significance to a first binary adder. If the result of this first addition equals or exceeds the denominational radix in which the digits are expressed a signal is applied to a carry storage device, and and a carry value is feed back to the first adder to modify the result of adding the succeeding pair of input digits. The result of the first addition is modified by the addition of filler digits if the carry condition exists. This second addition takes place in a further binary adder.

The processing of successive digits in the prior arrangement is limited in speed by the necessity for setting up the storage device under carry conditions and thereafter holding the next following pair of digits in the first adder until the addition of the carry value has been completed. In the present case the existence of a carry condition is recognised by examining the sum from a first adding arrangement. The actual carry value forms part of a correction value which also includes the filler digits. Thus, the signals representing a pair of input digits are propagated through the calculating arrangement at a rate dependent upon the inherent characteristics of the circuits, the correction value being added without the necessity for holding the digits in the first adder while the carry circuit becomes stable. Hence, the frequency with which successive digits may be applied to the arrangement is independent of the speed with which signals may be propagated through the calculating arrangement.

According to the present invention, electronic apparatus is provided for forming the algebraic sum of two values represented as electrical signals applied thereto and expressed as a succession of digits each coded according to the binary code, the coded signals representing successive digits being applied at successive predetermined digit times in order of increasing denominational significance, digits of both values having like denominational significance being applied simultaneously, the apparatus comprising a first adder to which the digit representing signals are applied and arranged to produce uncorrected sum signals and a carry signal, means for examining the uncorrected sum and carry signals to provide indicating signals to indicate whether or not a filler value is to be added to the said uncorrected sum signals to produce a corrected sum output and to indicate whether or not a carry value is to be added to uncorrected sum signals of next higher denominational significance produced by the first adder, filler generating means arranged to generate correction value signals in response to a signal indicating that a filler value is to be added and to a signal derived from the next lower denomination indicating that a carry value is to be added, the correction value signals representing the combination of those filler and carry values which are be added, and a second adder arranged to combine the correction signals with the said uncorrected sum signals to produce the corrected sum value.

Figures 2, 3:
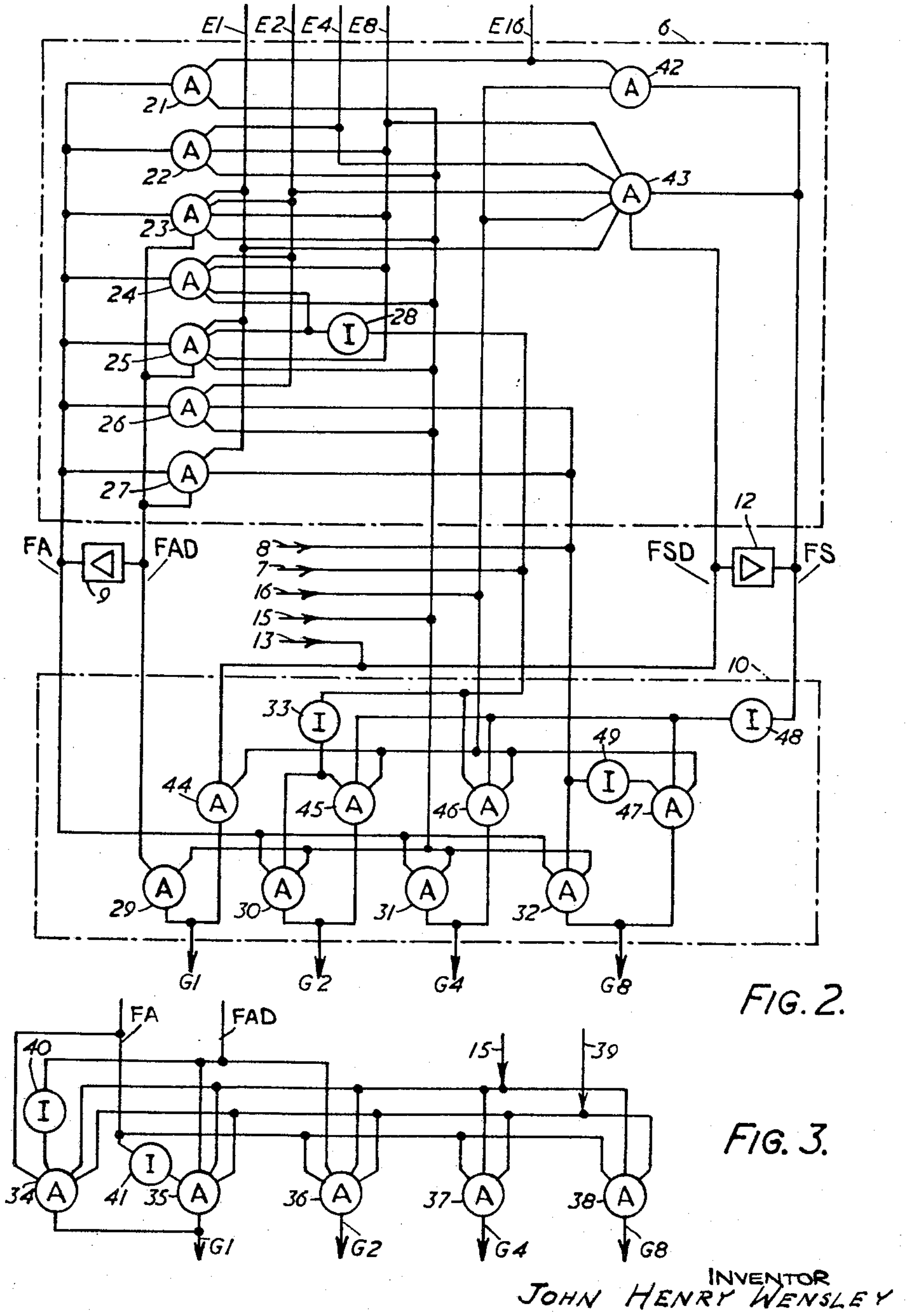

The invention will now be described, by way of example, with reference to the accompanying drawings in which, FIGURE 1 is a block schematic diagram of the calculating arrangement, FIGURE 2 shows in schematic form the carry recognition and filler generation arrangements of the apparatus of FIGURE 1, and FIGURE 3 shows an alternative filler generating arrangement.

Digits to be subjected to addition or subtraction are applied to lines 1 and 2 of the arrangement shown in FIGURE 1. Two digits are applied simultaneously and are represented in binary-coded form by electrical signals. One digit is applied over a group of signal lines 1—1 to 1–8, the suffix indicating the binary value represented by signals carried by the line. The second input digit is applied in a similar manner over signal lines 2–1 to 2–8.

Digits are applied in succession, in order of increasing denominational significance and are derived by conventional means from a storage device such as a shifting register in a computer. For example two numerical values to be added may be stored in two shifting registers 18 and 19 of conventional form, the values being represented, digit-by-digit, by binary-coded signals. The digits of the values may then be shifted out in synchronism under control of timing pulses in the conventional manner.

In order to demonstrate the operation of the arrangement it will be assumed that two sterling values are to be added together or that one is to be subtracted from the other. For this purpose the digits of the values are applied in sequence, starting with the digit representing pence, digits representing units-of-shillings, tens-of-shillings, units-of-pounds and tens-of-pounds following in that order.

In the following description it is assumed that the binary-coded signals representing the digit are electrical pulse signals, the presence of a signal denoting the presence of the corresponding binary component in the digit value. Thus, the digit 6 is represented by pulses occurring simultaneously on binary code component lines 4 and 2, pulses being absent from lines associated with binary components 8 and 1. It will be apparent, however, that since the digit representations are expressed in binary coded form, the code components "1" and "0" may be represented by other signals which represent one or another of two predetermined states. For example, these binary values may be represented by one or the other of two predetermined voltage values.

Digit representing signals are first applied to an input selection network 4 comprising a series of signal gates. The purpose of this network is to control the manner in which the signals are applied to the calculating arrangements proper. The digit signals applied to the lines 1–1 to 1–8 respectively are passed directly through gates to lines A1 to A8. For the sake of clarity the values in the binary code of signals passed through the arrangement will be termed the binary "weights" of the signals, and the weight of a signal carried by each line in the arrangement will be expressed by the suffix of the reference appropriate to that line. Thus the lines A–1 to A–8 carry binary signals of weights 1–8 respectively, these signals representing the binary code components of the input digit applied thereto.

The digit to be added to or subtracted from that applied to the lines 1–1 to 1–8 is represented by signals applied to lines 2–1 to 2–8 respectively. These lines are also connected through gates in the input selection network 4 and are applied to lines B1 to B8 at the output of the network. During an addition operation signals on the lines 2–1 to 2–8 pass directly to the lines B–1 to B–8 respectively. However, during subtraction, the value represented by the signals on the lines B–1 to B–8 is required to be the complementary form of the input digit on lines 2–1 to 2–8.

Subtraction is then performed in the well known manner by adding the complement of the digit represented by the values on the lines 2 to the digit represented by the values on the lines 1. Since, in the present case all possible digit values may be expressed by means of four binary code components, the operating radix of the adding arrangements is 16 and the complementary form of the digit values is consequently required to be expressed with respect to one less than this operating radix, that is, 15. The required complementary values are thus conveniently obtained by merely reversing the binary code notation of the applied digit representations. Consequently, those gates in the network 4 which are open to provide direct connection between the lines 2–1 to 2–8 and B–1 to B–8 during addition are closed during subtraction and a further set of four gates are opened. These latter gates are arranged to invert the applied signals, so that those lines B1 to B8 corresponding to the lines 2–1 to 2–8 which are not carrying input signals are selected to carry output signals. The gates are controlled by means of operation control signals applied over lines 15 and 16 from a control device 20.

The lines A1 to A8 and B1 to B8 are connected to a binary adder 5. The adder 5 is arranged to perform binary addition on the two groups of digit-representing signals and produces resulting signals on lines E1 to E16 expressed according to the binary code. Various arrangements are known for performing binary addition in the required manner. The addition of two values expressed as four binary digits of weights 1, 2, 4 and 8 may produce a result having five binary digits of weights 1, 2, 4, 8 and 16. Since the operating radix of the adder 5 is, as previously noted, 16, these result signals may be regarded as an uncorrected sum value represented by the signals on lines E1 to E8 and a carry signal represented by a signal on the line E16 if the uncorrected sum exceeds the operating radix.

Thus, it is necessary to correct subsequent addition operations by the addition of a carry when a signal occurs on the line E16. Moreover, when the input digits are expressed in a radix other than 16, as in the present case, further correction is necessary. This further correction involves the generation of filler digits during addition operations when the result sum value on lines E1 to E16 equals or exceeds the radix R$x$ in which the input digits are expressed. During subtraction operations it is also necessary to modify the result in dependence upon whether the minuend is greater or less than the subtrahend. In order to render the description of these correcting operations more readily understood, the operations of addition and subtraction will be considered separately.

Considering now the operation of addition, the lines E1 to E16 are connected to a carry recognition network 6. This network consists of a number of gates and is arranged to pass a filler indicating signal over a line FA during an addition operation whenever the sum indicated by the signals on the lines E is equal to or greater than the radix R$x$ of the input digit or when the sum is one less than the radix R$x$ of the input digit and the need for correction was recognised by a filler indicating signal over the line FA during the processing of the previous pair of input digits. Thus, the signal on the line FA indicates the need for the generation of a filler value and the addition of a carry to the next input digit.

The carry recognition network consists of a number of AND gates. These are selectively controlled by lines conditioned in accordance with the radix of the input digits currently being processed by radix control signals applied over lines 7 and 8 by the control device 20. In the example given, it will be recalled that sterling values are to be added, so that the first pair of input digits (pence) are expressed in radix 12, the second pair (shillings) are in radix 10, the third pair (tens-of-shillings) are in radix 2 and the succeeding digits, representing pounds, are in radix 10.

The arrangement of the carry recognition network 6 is shown in greater detail in FIGURE 2. One group of seven gates 21 to 27 in the carry recognition network 6 is conditioned during addition and the outputs from these gates 21 to 27 are passed to the line FA in common. The gates 21 to 27 are all conventional multi-input AND gates primarily conditioned by a signal on the addition control line 15, and each is arranged to pass a signal under one of the following seven conditions:

Condition 1 (Gate 21): A carry signal appearing on the line E16. This indicates that the sum is equal to or exceeds 16.

Condition 2 (Gate 22): Signals appearing simultaneously on lines E8 and E4. This indicates that the uncorrected sum is equal to or exceeds 12.

Condition 3 (Gate 23): Signals appearing simultaneously on lines E8, E2 and E1 if a signal was passed to line FA during processing of the immediately preceeding pair of input digits. This latter condition causes a signal to appear on a line FAD in a manner to be described. This indicates that the uncorrected sum of the present digits is 11, and that a carry arose during processing of the previous digits.

Condition 4 (Gate 24): Signals appearing simultaneously on lines E8 and E2. The gate 24 responsive to this condition is inhibited during the processing of the pence digits by a further input derived from a radix 12 control line 7 by means of an inverter 28. Thus a signal is passed during processing of decimal digits when the sum equals or exceeds 10.

Condition 5 (Gate 25): Signals appearing on lines E8 and E1 if a signal was passed to the line FA during processing of the preceding pair of input digits and represented by a signal on line FAD. Again, this gate is inhibited by the signal from inverter 28 during processing of pence digits so that a signal is passed to line FA if the sum equals 9 and a carry arose during processing of the previous digits when the present pair of digits are in decimal notation.

Condition 6 (Gate 26): A signal appearing on line E2 and a control signal occurring simultaneously on a radix 2 control line 8 denoting that the digits being processed are expressed in radix 2 (i.e. tens-of-shillings digits). Thus, the signal on line FA denotes that the sum is equal to or exceeds the radix 2.

Condition 7 (Gate 27): A signal on line E1 when the radix 2 control signal is present on line 8 and a carry arose during processing of the preceding pair of digits, signified by the signal on line FAD.

It will be seen that these conditions for the generation of the filler indicating signal on the line FA may be summarised as requiring firstly, an indicating signal if the signals on the lines E1 to E16 represent a value equal to or greater than the radix in which the digits are expressed, this signal causing a further signal to be applied at the next following digit time to indicate a carry condition, and secondly a corresponding indicating signal if the value represented by the signals on the lines E1 to E16 equals one less than the digit radix when the carry indicating signal is present.

The actual values which control the production of the indicating signals are determined by the conditioning of the gates in the network 6 in response to the radix control signals on the lines 7 and 8 from the control device 20. These radix control signals (the inhibiting signal for pence, or radix 12, processing required under conditions 4 and 5 and the radix 2 signal required under conditions 6 and 7) occur at predetermined digit times and may be controlled for example by apparatus such as a computer, with which the present apparatus is associated and, which supplied the groups of signals to the input registers 18 and 19 (FIGURE 1). Furthermore, it will be appreciated that digits may be expressed in other radices than those shown in the present example, the appropriate radix control signals being applied to control gates in the network 16 to produce the required indicating signals according to the conditions reviewed above.

It will be recalled that the input digits are applied in succession under control of timing pulses. These pulses are normally arranged to occur at a predetermined frequency so that successive digits are applied at known intervals. The interval between successive digits may thus be termed a digit-time. In order to produce the required signal on the line FAD, a signal from the network on the line FA is applied to a delay circuit 9 of conventional form and is delayed by one digit time. From the delay circuit 9 the signal passes to the line FAD and this line is connected as another input to the network 6. Thus a signal passed to the line FA during the processing of the immediately preceding pair of input digits appears on line FAD, and is used to control the gates in the network 6 which are responsive to the conditions 3, 5 and 7 noted above.

The signals on the lines FA and FAD are passed to a filler generator 10. This generator again comprises a network of gates which are conditioned in response to input signals to pass output signals to lines G1 to G8. These signals represent in binary coded form the value of the correction digits to be added to the sum obtained from the adder 5. The filler generator 10 is shown in greater detail in FIGURE 2. The arrangement of one gate 29 is such that a signal is passed to line G1 whenever a signal appears on the line FAD during an addition operation, the gate 29 being controlled by the lines 15 and FAD. Thus, the recognition of the need for a carry during the processing of a pair of input digits by the appearance of a signal on line FA causes the addition of 1 to the sum resulting from the addition of the next following pair of input digits.

The three remaining gates 30, 31 and 32 are arranged to control the passage of signals to the lines G2, G4 and G8 respectively during addition. The gate 30 is controlled jointly by an inhibiting signal derived by an inverter 33 from the radix control line 7 which carries a signal during the processing of pence digits and by the addition control line 15 and the line FA. Hence the line G2 carries a signal whenever the need for a filler digit is recognized by the presence of a signal on line FA except when the input digit is expressed in radix 12.

The gate 31 allows the passage of a signal to line G4 whenever a signal occurs on line FA.

The line G8 is controlled by the gate 32 which opens under the joint control of signals on the lines FA, 15 and 8, the line 8 carrying a radix control signal only when the input digits representing tens-of-shillings are being processed.

Thus, the filler digit for pence is represented by a signal of weight 4 on line G4. For decimal values the filler digit of 6 is represented by signals of weights 2 and 4, while the tens-of-shillings filler digit (radix 2) is 14 and is represented by signals of weights 8, 4 and 2.

The lines G1 to G8 and E1 to E8 (FIGURE 1) are connected to a second binary adder 11 which is similar to the adder 5 except that in this case only four outputs of weights 1, 2, 4 and 8 respectively are possible. Thus, the sum derived from the adder 5 is corrected by the addition of a correction value made up of a filler digit if required and if necessary by the addition of a carry derived from the addition of the preceding input digits. There will obviously be a small delay in the production of the filler digit, and the signals fed from the lines E1 to E8 to the adder 11 must be similarly delayed so that they reach the adder 11 concurrently with the filler digit. The corrected sum is then applied over output lines 3–1 to 3–8 to a sum register 34.

It will be seen from the example given above that the filler generator is arranged to deal with digits expressed in radices 12, 10 and 2, as required by the processing of sterling values. The addition of values expressed in decimal only is obviously possible since the radix control lines 7 and 8 will not carry signals in this case. Moreover, since the generation of filler digits is accomplished by means of gates it will be apparent that the arrangement may be modified to deal with digits expressed in other radices greater than 2 by suitably modifying the gate connections. Values expressed by digits having dissimilar radices may be dealt with by the provision of suitable radix control lines similar in function to the lines 7 or 8. In the cases of odd radices, it is obviously necessary to modify the conditions under which a signal is passed to the line G1, since this signal indicates a component weight of 1 and may occur either because a filler digit only is required or because a carry only is required but cannot occur if both a filler and a carry are required. FIGURE 3 shows, as an example, the gating arrangements required for dealing with digits of radix 3. The lines G1 to G8 are output lines from five gates 34 to 38, all of which are primarily controlled by the addition control line 15 and a radix 3 control line 39. The presence of a signal only on line FA allows the gates 34, 37 and 38 to pass signals of weights 1, 4 and 8 respectively to provide a filler value of 13. An inverter 40 is provided in association with the line FAD and its output is connected to allow the gate 34 to open in the absence of a signal on the line FAD. If, however, a signal is applied only on the line FAD, the gate 34 is maintained closed by the inverter 40 and the second gate 35 associated with the line G1 is opened, this gate being connected by means of a similar inverter 41 to the line FA. Since the remaining gates are closed a signal of weight 1 only is passed to line G1. If signals on both lines FA and FAD are present, however, the gates 34 and 35 are maintained closed by the inverters 40 and 41 and the gates 36, 37 and 38 are opened, providing a correction value of 14.

Turning now to the operation of subtraction, it will be recalled that the subtrahend is applied to the input lines 1–1 to 1–8 and the minuend to the lines 2–1 to 2–8 (FIGURE 1). As before, the pairs of digits are applied in succession, beginning with the pence digits. The subtrahend digit passes directly through the input selection network 4 to the lines A1 to A8, whereas the minuend is inverted to complement with respect to fifteen form and is applied to the lines B1 to B8. The adder 5 again sums the signals presented on the lines A and B and passes the resultant signals to the lines E1 to E16, and so to the carry recognition network 6. (FIGURES 1 and 2.)

In the case of subtraction, the gates 21 to 27 previously described, which are conditioned during addition are now held closed and a further set of gates 42, 43 is conditioned by a control signal over a subtraction control line 16, to pass signals in dependence upon the rules for subtraction. As in the case of addition, the purpose of the network is to recognise a predetermined condition, in this case a condition which does not require a borrow from the next higher denomination, and to pass a signal to indicate that the "no-borrow" condition exists. This signal is passed over a line FS, and, as in the case of the carry recognition signal of addition, provision is made by means of a delay unit 12 to derive a signal on a line FSD which indicates the occurrence of a "no-borrow" condition due to the processing of the present pair of input digits at the time when the next following digits are being processed.

Two gates 42 and 43 are used for passing the "no-borrow" recognition signal. The gate 42 is controlled by a signal appearing on the line E16, indicating that the resultant value derived from the adder 5 is equal to or exceeds 16, that is to say, the resultant exceeds 15. The gate 43 is opened by coincident signals on lines E8, E4, E2, E1 and FSD, which indicates a resultant value of 15 derived from the adder 5 if a "no-borrow" condition was recognised during the processing of the immediately preceding pair of digits.

In order to explain the significance of the "no-borrow" signal the operation of subtraction by the addition of a value expressed as a complement with respect to 15 will be briefly reviewed. The operation of complementing to 15 results in a value B being expressed as $15-B$. Hence adding this value to another value A gives a result $A+15-B$.

Provided that the value of A exceeds that of B, the sum registered will always exceed 15 and will thus equal or exceed 16 and so will require a five-binary digit code for its expression. However, in the present case only four-binary digits have significance in expressing digit values, the "carry" component of weight 16 being disregarded. Thus the result may be expressed as $A+15-B-16$, so that the result is one less than the true value.

If, however, the value of A is less than the value of B it is necessary to borrow unity from the next higher denomination (in this case the next following digit) and in the case of a decimal digit the experssion then becomes $A+15-B-16+10$. This again produces a result which is one less than the true value. It will be obvious that the borrowed digit is equal to the radix in which the currently processed digit is expressed, and hence under "borrow" conditions a filler value equal to the radix in which the digit is expressed is required.

The borrowing of unity from the next higher denomination, however, requires that the result of the processing of the next following pair of digits shall be diminished by 1. Thus, if a borrow has taken place the results obtained during processing of the next pair of digits (true value $-1$) will in fact be correct.

The rules for correction are thus expressed as follows. If a borrow is not required the result derived from adder 5 will include the weight 16 and the result of processing the next succeeding pair of input digits must be increased by 1. If a borrow is required, then the value of the result derived from the adder 5 will be less than 16, so that no signal of weight 16 will be present. In this case a value equal to the radix in which the current digit is expressed must be added to the result and no correction is required to the following digits.

It will also be apparent that if the values A and B are equal the result from adder 5 will be 15. In this case the determination of whether or not a borrow is required depends upon the result obtained during the processing of the preceding pair of input digits. If for example, a borrow took place, then the processing of the current digits will also require a borrow. On the other hand, if no borrow took place, then the addition of 1 to the result provides a sum of 16. Since 16 is effectively subtracted from this result the correct answer, 0, is obtained. Hence the "no-borrow" condition is also recognised if the sum derived from the adder 5 equals 15 and a "no-borrow" condition was recognised during the processing of the previous pair of digits.

The foregoing conditions will produce the correct result for all pairs of input digits except the first. Since in this case there is no preceding denomination the result obtained will always be one less than the true value. Consequently a further correction is required to add 1 to the result obtained from processing the first pair of digits. This correction is conveniently obtained by providing a control signal on a line 17 from the control device 20 (FIGURE 1). This signal occurs at the time when the first pair of digits are being processed. The signal on the line 17 is passed by a gate 14 controlled by the subtraction control line 16, and is applied to the line FSD. Thus the occurrence of a "no-borrow" condition in a preceding denomination is simulated, resulting in the addition of 1 to the result.

The presence of absence of the "no-borrow" signal conditions the filler generator 10 to provide either an "add 1" signal which may be regarded as equivalent to the carry signal in adding, or signals representing the required borrow, or filler, value equal to the radix of the digits.

The "add 1" signal is derived from a gate 44 in a way similar to that for deriving the carry signal during addition. The gate is conditioned by a control signal on line 16 and the presence of a signal on the line FSD is arranged to open the gate 44 to pass a signal to the line G1.

The borrow value is derived from gates 45, 46 and 47 having their outputs connected to the lines G2, G4 and G8 respectively. These gates 45 to 47 are primarily conditioned by the control signal on line 16 denoting that subtraction is taking place. The gate 45, associated with the line G2, is inhibited from passing a signal by means of inverters 48 and 33, controlled by the signals on the lines FS and 7 respectively. Thus, a signal of weight 2 is passed to the line G2 during the processing of digits other than pence unless the "no-borrow" condition is recognised. The gate 46 associated with the line G4 is opened by a signal on line 7, but is inhibited by the signal on line FS so that a signal of weight 4 is produced for the processing of pence digits only unless the "no-borrow" condition is recognised. Finally, the gate 47 associated with the line G8 is inhibited by signals on lines FS and 8 by means of inverters 48 and 49 respectively. Thus a signal of weight 8 is produced only if a "no-borrow" condition has not been recognised and digits representing values other than tens-of-shillings are being processed.

It will be seen, therefore, that the effective borrow digits produced for processing of sterling values are 12 for pence (represented by components of weights 8 and 4), 2 for tens-of-shillings (represented by the single component of weight 2), and 10 for other digits which are expressed in radix 10 (represented by components of weights 8 and 2).

The resultant signals on the lines G1 to G8 are passed to the second adder 11 (FIGURE 1) and, as in the case of addition, these signals are combined with the signals on the lines E1 to E8 therein to form a final corrected sum which is represented by signals passed to the output lines 3–1 to 3–8 and thence to the sum register 34.

As in the case of addition, it will be apparent that the arrangement for subtracting although described in relation to digits representing a sterling value, may be modified to deal with digits expressed in other radices greater than 2 by suitably modifying the appropriate gate connections in the recognition network and the filler generator 10.

The arrangements described are also adapted to deal with negative values, such values being applied to the input lines 1 and 2 in complementary form in the conventional manner.

The arrangement described is particularly suitable for high speed adding and subtracting since the modification of the uncorrected sum digit derived from the first calculating stage (the adder 5) is effected by examining its value in the carry recognition network and recognising the need for the application of a correction value in dependence upon the conditions of the component lines. This recognition is then used to control the selection of the required correction value to be added to the uncorrected sum in a secondary calculating stage in order to correct the sum digit to its true value having regard to the radix in which it is expressed. Thus the modification of the uncorrected sum takes place at a later stage in the arrangement and is independent of the operation of the first adder. Hence, there is no delay occasioned during the first addition and consequently the frequency with which digits may be applied to the input of the arrangement is limited only by the speed of response of the first adder and is not affected by the necessity for introducing a variable modification therein.

What I claim is:

1. Electronic apparatus for forming the algebraic sum of two multidenominational values each comprising a succession of input digits in order of increasing denominational significance encoded according to binary code notation, corresponding denominational digits of both values occurring concurrently and being represented by substantially simultaneously occurring electrical signals representing the binary code elements of the applied digits, including means for registering a pair of concurrently occurring input digits; a first binary adder; gating means connected between said registering means for both digits and said first adder for transferring the pair of input digits to the first adder, the first adder being responsive only to the application of the pair of digits to produce a binary coded sum value having one more code element than the input digits, said one more code element being of greatest binary code significance; means for examining said binary coded sum value to produce concurrently with said sum value a single carry indicating signal; means for deriving from, and delayed relative to, said carry indicating signal a carry-in signal occurring concurrently with the binary coded sum value associated with the input digits of next succeeding denominational significance, said examining means producing said carry indicating signal in response only to the occurrence of a binary coded sum value representation at least equal to a predetermined value and to the concurrent occurrence of the carry-in signal resulting from the preceding pair of input digits and a binary coded sum value equal to one less than said predetermined value; correction digit generating means operable under control of said carry indicating signal resulting from the current pair of digits and the carry-in signals resulting from the preceding pair of input digits for producing a binary coded correction digit including filler and carry components; a second adder; and means for applying said correction digit and all the binary code elements except that of greatest significance of said binary coded sum value to said second adder, the second adder being responsive thereto to produce a final corrected sum digit having the same number of code elements as the input digits.

2. Electronic apparatus for forming the algebraic sum of two multidenominational values each comprising a succession of input digits in order of increasing denominational significance encoded according to binary code notation, corresponding denominational digits of both values occurring concurrently and being represented by substantially simultaneously occurring electrical signals representing the binary code elements of the applied digits, including means for registering a pair of concurrently occurring input digits; a control device operable selectively to provide an addition operation signal and a subtraction operation signal; a first binary adder; gating means controlled by said control device to apply one input digit of the pair directly to said first adder and to apply the other input digit of the pair directly to said first adder in response to said addition operation signal and inverted to said first adder in response to said subtraction operation signal, the first adder being responsive only to the application of the pair of digits to produce a binary coded sum value having one more code element than the input digits, said one more code element being of greatest binary code significance; means for examining said binary coded sum value to produce a single carry indicating signal concurrently with said binary coded sum value; means for deriving from and delayed relative to said carry indicating signal a carry-in signal occurring concurrently with the binary coded sum value resulting from the input digits of next succeeding higher denominational significance, said examining means producing said carry indicating signal only in response to the binary coded sum value being at least equal to a predetermined value and to the concurrent occurrence of the carry-in signal resulting from the preceding pair of input digits and the binary coded sum value being equal to one less than said predetermined value; correction digit value generating means operable under control of said carry indicating signal resulting from the current pair of digits and the carry-in signal resulting from the preceding pair of digits for producing a binary coded correction digit including filler and carry components; a second adder; and means for applying said correction digit and all the binary code elements except that of greatest significance of said binary coded sum value to said second adder, the second adder being responsive thereto to produce a final corrected sum digit having the same number of code elements as the input digits.

3. Electronic apparatus for forming the algebraic sum of two multidenominational values each comprising a succession of input digits in order of increasing denominational significance encoded according to binary code notation, corresponding denominational digits of both values occurring concurrently and being represented by substantially simultaneously occurring electrical signals representing the binary code elements of the applied digits, including means for registering a pair of concurrently occurring input digits; a control device operable to generate addition and subtraction operation signals selectively; a first binary adder; gating means operative in response to said addition operation signal to transfer the pair of input digits from the registering means directly to said first adder and operative in response to said subtraction operation signal to transfer one digit of the pair directly to said first adder and to apply the inverse of the other digit of the pair to said first adder, the first adder being responsive only to the application of the pair of digits to produce a binary coded sum value having one more code element than the input digits, said one more code element being of greatest binary code significance; means for examining said binary code value to produce concurrently with said binary coded value a single carry signal; signal delay means having a delay time corresponding to the interval between the application of input digits of successive denominations; means for connecting said carry signal to said signal delay means to produce a delayed carry signal concurrently with the binary coded sum value resulting from the next succeeding pair of input digits; means for applying said delayed carry signal to said examining means, the examining means being operative to produce said carry signal only in response to the binary coded sum value being at least equal to a predetermined value and to the binary coded sum value being equal to one less than said predetermined value concurrently with the delayed carry signal resulting from the preceding pair of digits; correction digit generating means; means for applying said carry and delayed carry signals to said correction digit generating means to produce a binary coded correction digit including filler and carry components; a second adder; and means for applying said correction digit and all the binary code elements except that of greatest significance of said binary coded value to said second adder, the second adder being responsive thereto to produce a final corrected sum digit having the same number of code elements as the input digits.

4. Electronic apparatus for forming the algebraic sum of two values expressed as digits in a succession of denominations of differing radix occurring in order of increasing significance, the digits all being expressed according to binary code notation by the same number of binary code elements, each digit being represented by substantially simultaneously occurring electrical signals, digits of corresponding denominations of the input values occurring concurrently, including means for registering a pair of concurrently occurring input digits; a first binary adder; gating means connected between said registering means for both digits and said first adder for applying the input digits to the first adder, the first adder being responsive only to the application of the pair of digits to produce a binary coded sum value having one more code element than the input digits, said one more code element being of greatest binary code significance, means for generating a radix signal representing the denominational radix of the pair of input digits, means for examining said binary coded sum value and operable to produce concurrently therewith a carry indicating signal; means for deriving from and delayed relative to said carry indicating signal a carry-in signal occurring concurrently with the binary coded sum value resulting from the input digits of the next succeeding denomination, said examining means being responsive to the radix signal and said binary sum value to produce said carry indicating signal when said binary coded sum value is at least equal to the radix of the pair of input digits and being further responsive to the carry-in signal resulting from the preceding pair of input digits to produce said carry indicating signal when said binary coded value equals one less than said predetermined value; correction digit generating means operable jointly under control of said radix signal, said carry indicating signal and said carry-in signal for producing a binary coded correction digit including filler and carry components; a second adder; and means for applying said correction digit and all the binary code elements except that of greatest significance of said binary coded sum value to said second adder, the second adder being responsive thereto to produce a final corrected sum digit having the same number of code elements as the input digits.

5. Electronic apparatus for forming the algebraic sum of two values expressed as digits in a succession of denominations of differing radix occurring in order of increasing significance, the digits all being expressed according to binary code notation by the same number of binary code elements each digit being represented by substantially simultaneously occurring electrical signals, digits of corresponding denominations of the input values occurring concurrently, said apparatus including means for registering a pair of concurrently occurring input digits; a control device operable to produce selectively an addition operation signal and a subtraction operation signal; a first binary adder; gating means controlled by said control device to apply one input digit of the pair directly to said first adder and to apply the other input digit of the pair directly to said first adder in response to the addition operation signal and inverted to said first adder in response to the subtraction operation signal, the first adder being responsive only to the application of the pair of digits to produce a binary coded sum value having one more code element than the input digits, said one more code element being of greatest binary code significance; means for generating a radix signal representing the denominational radix of the pair of digits applied to said first adder; means for examining said binary code sum value to produce concurrently therewith indicating signal; means for deriving from said indicating signal a carry signal occurring concurrently with the binary coded sum value derived from the input digits of the next succeeding denomination; means operable in response to the subtraction operation signal only during processing of the pair of input digits of least denominational significance to produce a first correction value, said examining means being controlled jointly by said radix signal, said addition and subtraction operation signals, said indicating signal, the carry signal derived from the preceding input digits and said first correction signal to produce said indicating signal during an addition operation in response to the binary coded sum value alone being at least equal to the radix of the current denomination, and in response to the binary coded value being equal to one less than the radix of the current denomination and the carry signal being present and to produce said indicating signal during a subtraction operation in response to the code element of greatest significance of the binary coded sum value being a binary one, and in response to all the remaining elements of the sum value being binary ones together with the presence of the first correction value during processing of the least significant pair of digits and with the presence of the carry signal, derived from the preceding digits, during processing of the remaining pairs of digits; correction value generating means controlled jointly by said radix signal, said addition and subtraction operation signals, said indicating signal and said carry signal to produce a correction value during an addition operation equal to the difference between the radix of the current denomination and one more than the greatest value expressible by all the binary code elements except that of greatest significance of the binary coded sum value when said indicating signal is present, and further controlled by the first correction value to produce during a subtraction operation a second correction value equal to the radix of the current denomination in the absence of said indicating signal and to increase by one the second correction value so produced when said carry signal is present and when the first correction value is present; a second adder; and means for applying said second correction value and all the binary code elements except that of greatest significance of said binary coded sum value to said second adder, the second adder being responsive thereto to produce a final corrected algebraic sum digit having the same number of code elements as the input digits.

6. Electronic apparatus for forming the sum of two multi-digit input values, each digit of said input values being encoded in binary coded notation by a predetermined number of code elements represented by electrical signals, said apparatus including registering means for registering in pairs the digits of the two input values in order of ascending denominational significance, each pair of registered digits being expressed in a denominational radix and comprising a digit of one input value registered concurrently with the digit of corresponding denominational significance of the other input value; a control device; a first binary adder having only two input circuits; gating means operative to transfer the pairs of digits from the registering means to said first adder under the control of said control device, each digit of a pair being fed to a separate one of said two input circuits, respectively; said first adder being operative in a radix greater than the denominational radix of said input digits to produce an uncorrected sum of each pair of transferred digits, said uncorrected sum being expressed in a binary coded notation having one more code element of next higher significance than said predetermined number of code elements; examining means operable to produce a carry indicating signal concurrently with the production of the uncorrected sum of a pair of transferred digits; means for deriving from said indicating signal a delayed carry signal occurring concurrently with the production of the uncorrected sum of the pair of transferred digits of next higher denominational significance; means to apply to said examining means the uncorrected sum of a pair of transferred digits together with the delayed carry signal derived from the digits of next lower denominational significance; said examining means being operated only in response to the uncorrected sum being at least equal to the denominational radix of the transferred pair of digits and in response to the uncorrected sum being equal to one less than said denominational radix together with said delayed carry signal derived from the digits of next lower denominational significance; correction digit generating means operative under the control of said carry indicating signal and of said delayed carry signal derived from the digits of next lower denominational significance to produce a correction digit including filler and carry components; and a second binary adder responsive to the correction digit and to all the code elements except that of highest significance of said uncorrected sum to produce a final corrected sum expressed in the denominational radix of the corresponding input digits and encoded in binary coded notation by said predetermined number of code elements.

7. Electronic apparatus for forminng the difference of two multidigit input values, each digit of said input values bein encoded in binary coded notation by a predetermined number of code elements represented by electrical signals, said apparatus including registering means for registering in pairs the digits of the two input values in order of ascending denominational significance, each pair of registered digits being expressed in a denominational radix and each pair comprising a digit of one input value registered concurrently with the digit of corresponding denominational significance of the other input value; a control device; a first binary adder having only two input circuits; gating means operative to transfer one digit of a pair and the inverse of the other digit of said pair from the registering means to said first adder under the control of said control device, said one digit and said inverse of the other digit being fed to a separate one of said two input circuits, respectively; said first adder being operative in a radix greater than the denominational radix of said input digits to produce an uncorrected sum of each pair of transferred digits, said uncorrected sum being expressed in a binary coded notation having one more code element of next higher significance than said predetermined number of code elements; examining means operative to produce a two-state borrow indicating signal occurring concurrently with the production of the uncorrected sum of the pair of transferred digits of next higher denominational significance; means for deriving from said borrow indicating signal in its first state a delayed borrow signal occurring concurrently with the production of the uncorrected sum of the pair of transferred digits of next higher denominational significance; means to apply to said examining means the uncorrected sum of a pair of transferred digits together with the delayed borrow signal derived from the digits of next lower significance, the borrow indicating signal being in the first state only in response to all the code elements of the uncorrected sum except that of highest significance being of binary one significance and a delayed borrow signal derived from the digits of next lower denominational significance being present, and in response to the code element of highest significance being of binary one significance; correction digit generating means operative under the control of said borrow indicating signal derived from the current digits and of said delayed borrow signal derived from the digits of next lower denominational significance to produce a correction value equal to the denominational radix of the pair of registered digits when the borrow indicating signal is in its second state and to increase by one the correction value so produced when said delayed carry signal derived from the digits of next lower denominational significance is present; and a second binary adder responsive to the correction value and to all the code elements except that of highest significance of said uncorrected sum to produce a corrected difference expressed in the denominational radix of the corresponding input digits and encoded in binary coded notation by said predetermined number of code elements.

8. An electronic adder/subtractor including first registering means for registering the digits of a first value in succession; second registering means for registering the digits of a second value in succession, the digits of both values being registered in order of ascending denominational significance and digits of corresponding significance being expressed in the same denominational radix and being registered concurrently; a first binary adder having only two input circuits; control means operable to generate selectively an addition operation signal and a subtraction operation signal; gating means connected between said first adder and the first and second registering means and operative in response to said addition operation signal to apply a pair of digits comprising a digit of said first value and a digit of corresponding significance of the second value to the two input circuits respectively of said first adder and operative in response to said subtraction signal to apply a pair of digits comprising a digit of said first value and the inverse of the digit of corresponding significance of the second value to the two inputs respectively of the first adder; said first adder being operative to form the sum of said pair of digits expressed in binary coded form by a number of code elements of ascending significance; examining means operable to produce a carry signal; means operative to delay said carry signal by an interval corresponding to the interval between successive digits; a second binary adder; means to apply the highest significant code element to said examining means and to apply the remaining code elements both to said examining means and to said second adder; said examining means being operative in response to the addition opeartion signal when the sum is at least equal to the radix of the pair of digits and when the sum is equal to the radix minus one and the delayed carry signal results from operating on the preceding pair of digits, said examining means also being operative in response to the subtraction operation signal when the highest significant code element is of binary one significance and when the remaining code elements are all of binary one significance and the delayed carry signal, resulting from the preceding pair of digits, is present; a correction digit generator operative under the control of said carry signal resulting from the current pair of digits and the delayed carry signal resulting from the preceding pair of digits to generate a correction digit including filler and carry components; means to apply the correction digit to the second adder; the second adder being operative to form a corrected algebraic sum digit expressed in the same radix as the pair of input digits.

References Cited in the file of this patent

UNITED STATES PATENTS

| | | |
|---|---|---|
| 2,890,830 | Woods-Hill | June 16, 1959 |
| 2,890,831 | Townsend | June 16, 1959 |
| 2,989,237 | Duke | June 20, 1961 |